US010320538B2

(12) United States Patent
Belschner et al.

(10) Patent No.: US 10,320,538 B2
(45) Date of Patent: Jun. 11, 2019

(54) METHOD AND SYSTEM FOR COORDINATED RADIO RESOURCE ASSIGNMENT

(71) Applicant: Deutsche Telekom AG, Bonn (DE)

(72) Inventors: Jakob Belschner, Frankfurt (DE); Paul Arnold, Frankfurt (DE); Oscar D. Ramos-Cantor, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/560,490

(22) PCT Filed: Mar. 22, 2016

(86) PCT No.: PCT/EP2016/056268
§ 371 (c)(1),
(2) Date: Sep. 22, 2017

(87) PCT Pub. No.: WO2016/150967
PCT Pub. Date: Sep. 29, 2016

(65) Prior Publication Data
US 2018/0062802 A1 Mar. 1, 2018

(30) Foreign Application Priority Data
Mar. 23, 2015 (EP) .................................... 15160272

(51) Int. Cl.
*H04L 5/00* (2006.01)
*H04B 17/336* (2015.01)
*H04W 88/08* (2009.01)

(52) U.S. Cl.
CPC .......... *H04L 5/0035* (2013.01); *H04L 5/0058* (2013.01); *H04B 17/336* (2015.01); *H04W 88/08* (2013.01)

(58) Field of Classification Search
CPC .......... H04W 72/042; H04W 72/0426; H04W 72/0433; H04L 5/0035; H04L 5/0058; H04B 7/024; H04B 7/026; H04B 17/336
See application file for complete search history.

(56) References Cited

U.S. PATENT DOCUMENTS

| 2012/0027108 A1 | 2/2012 | Hong et al. | |
| 2013/0242769 A1* | 9/2013 | Hammarwall | H04L 5/0016 370/252 |

(Continued)

OTHER PUBLICATIONS

NSN, Nokia: "Simulation Results for CoMP scenario.2 with non-ideal backhaul", 3GPP Draft; R1-136023, vol. RAN WG1, No. 75, Nov. 16, 2013 (Nov. 16, 2013), XP050751427, USA.

(Continued)

*Primary Examiner* — Paul H Masur
(74) *Attorney, Agent, or Firm* — Leydig, Voit & Mayer, Ltd.

(57) ABSTRACT

A method for coordinated scheduling with transmission point blanking of a plurality of radio resources includes: a) calculating a first metric value for each combination of a mobile station of a network and each of a plurality of radio resources; b) calculating a second metric value for each combination under the assumption that at least one of the at least two base stations which is not connected to the respective mobile station using a concerned radio resource is muted; c) selecting the highest calculated metric value; d) determining whether or not to assign the radio resource to the mobile station corresponding to the highest metric value; e) setting the other metric values corresponding to the radio resource to a predefined metric value; and f) repeating steps c) to e) for the next highest metric value until all metric values are set to the predefined metric value.

18 Claims, 3 Drawing Sheets

(56) References Cited

U.S. PATENT DOCUMENTS

| | | | |
|---|---|---|---|
| 2015/0049621 A1* | 2/2015 | Liu | H04L 5/0048 |
| | | | 370/252 |
| 2015/0063222 A1 | 3/2015 | Wang et al. | |
| 2015/0256306 A1* | 9/2015 | Kim | H04B 7/024 |
| | | | 370/329 |
| 2016/0277942 A1* | 9/2016 | Chande | H04L 1/0002 |
| 2016/0286478 A1* | 9/2016 | Zhang | H04W 24/02 |

OTHER PUBLICATIONS

NSN, Nokia: "Inter-eNB signaling design to support coordinated muting", 3GPP Draft; R1-140563, vol. RAN WG1, No. 76, Feb. 9, 2014 (Feb. 9, 2014), XP050736089.

Daewon Lee, et al., "Coordinated Multipoint Transmission and Reception in LTE-Advanced: Deployment Scenarios and Operational Challenges", IEEE Communications Magazine, vol. 50, No. 2, Feb. 2012, pp. 148-155.

3GPP TR 36.819 V11.2.0 (Sep. 2013), $3^{rd}$ Generation Partnership Project; Technical Specification Group Radio Access Network; Coordinated multi-point operation for LTE physical layer aspects (Release 11), Sep. 2013, pp. 1-70.

\* cited by examiner

METHOD AND SYSTEM FOR COORDINATED RADIO RESOURCE ASSIGNMENT

CROSS-REFERENCE TO RELATED APPLICATIONS

This application is a U.S. National Phase application under 35 U.S.C. § 371 of International Application No. PCT/EP2016/056268, filed on Mar. 22, 2016, and claims benefit to European Patent Application No. EP 15160272.9, filed on Mar. 23, 2015. The International Application was published in English on Sep. 29, 2016 as WO 2016/150967 A1 under PCT Article 21(2).

FIELD

The present invention is related to a method and a system for coordinated scheduling with transmission point blanking of a plurality of radio resources.

BACKGROUND

Modern mobile radio systems (e.g. Long-Term Evolution (LTE) and LTE-Advanced) are characterized by a frequency reuse factor of one. This means that all base stations (BSs) can use the full system bandwidth to transmit and receive data. A frequency reuse factor of one is considered to be very efficient from a spectrum usage point of view. However, for the so called downlink transmission from the BS to the mobile station (MS), a frequency reuse factor of one means that the MS receives interference from all active neighboring BSs. If an MS is located at a position where it receives high interference power, this can lead to a degradation in the signal to interference and noise ratio (SINR) at the receiver of the MS. The result can be a low performance (especially in terms of data throughput) or service interruptions at the affected MS.

Coordination between BSs can be a solution for such problems. A set of different coordination schemes has been developed. The state of the art includes transmission point blanking, coordinated beamforming, coordinated scheduling and joint transmission (e.g. Lee, D., Seo, H., Clerckx, B., Hardouin, E., Mazzarese, D., Nagata, S., & Sayana, K. (2012). Coordinated multipoint transmission and reception in LTE-advanced: deployment scenarios and operational challenges. IEEE Communications Magazine, 50(2), 148-155. doi: 10.1109/MCOM.2012.6146494).

Transmission point blanking in combination with coordinated scheduling is considered in the following, as they offer advantages for practical implementation, in particular low requirements in terms of latency and bandwidth in the backhaul network, and low overall implementation complexity.

A framework for coordination between BSs is described in US 2012/0027108 A1. BSs of a coordination cluster exchange information about the transmission schemes they intend to use in the future (as shown in FIG. 9 of US 2012/0027108 A1). Furthermore, US 2012/0027108 A1 focuses on decentralized schemes. The BSs of a coordination cluster by default have the same rights. Based on a certain metric one BS then becomes the "leading base station" for a certain part of the frequency band (e.g. paragraph [0104] of US 2012/0027108 A1). A second architecture which enables coordination is the usage of a central entity (Scenario 2 in Table A.1-1 of 3GPP Technical Report Coordinated multi-point operation for LTE physical layer aspects (Release 11), Version 11.2.0 (available at www.3gpp.org)). The central entity is the master of the coordination and provides decisions or recommendations on how a group of BSs should act.

With respect to transmission point blanking in combination with coordinated scheduling, the master of a cooperation, being it a central entity or a leading base station, makes recommendations or decisions on the usage of radio resources (RR, corresponds to a resource block in LTE) in the system as it is described in the following.

Reference is now made to the system according to FIG. 1, which shows an exemplary mobile radio network 10 with two BSs 12, 13. A central coordinating entity 11 (called coordinator in the following) is connected to the BSs 12, 13, e.g. through the backhaul link via an optical fiber. At each time instance, both BSs 12, 13 can make use of two RRs (RR1, RR2) independently. In the example, each BS 12, 13 serves one respective MS 14, 15. MS 14 is served by BS 12 illustrated by a respective serving link and MS 15 by BS 13 illustrated by a respective serving link. Furthermore, a BS 12, 13 interferes the respective MS 14, 15 of the other BS 13, 12. BS 12 interferes MS 15 illustrated by a respective interfering link and BS 13 interferes MS 14 illustrated by a respective interfering link, if both BSs 12, 13 transmit on the same RRs (RR1, RR2). The interference can be avoided, if a BS 12, 13 does not make use of a certain RR. The following examples shall illustrate the possibilities:

1. BS 12 transmits to MS 14 on RR1 and RR2. At the same time BS 13 transmits to MS 15, also using RR1 and RR2. This leads to a situation where both BSs 12, 13 can make use of the full bandwidth but high interference might occur, i.e. both MSs 14, 15 are interfered on both RRs by the other BS 13, 12.

2. BS 12 transmits to MS 14 on RR1 and BS 13 to MS 15 on RR2. Due to the orthogonality of the RRs, no interference occurs. As BS 12 does not transmit on RR2, MS 15 does not receive interference on this RR2. The same applies for BS 13 and RR1 where MS 14 receives no interference. However, the bandwidth that BS 12 and BS 13 can use is limited to half of the system bandwidth. This example for interference avoidance is especially useful for situations in not fully loaded systems, where the BSs 12, 13 do not require the unused RRs.

3. In special cases a reduction of interference is needed to guarantee a certain level of network quality. As an example MS 14 could be located at a position where the interfering link from BS 13 to MS 14 is strong. In consequence the signal to interference and noise ratio (SINR) at MS 14 drops below an acceptable level. The low SINR can lead to a service interruption for MS 14. It can therefore be required that BS 13 does not use the RRs which BS 12 uses to transmit to MS 14 in order to reduce the interference at MS 14.

The task of the coordinator 11 is to maintain an overview about the situation in the network 10 and to coordinate the transmissions of the BSs 12, 13. With respect to coordinated scheduling and transmission point blanking this means that:

1. In case the network is not fully loaded, the coordinator 11 tries to find an optimum RR assignment for the network consisting of the BSs 12, 13 attached to the coordinator 11. This refers to coordinated scheduling and the example 2 given above.

2. The coordinator 11 can make a decision that certain RRs at a BS 12, 13 should not be used in order to reduce interference for MSs 14, 15 attached to other BSs 13, 12. This refers to transmission point blanking and the example 3.

There are two operational modes for a coordinator 11:

In case a coordinator 11 is provided with real-time (or close to real-time) information about the status in the network 10, especially an information about the path losses and radio channels of the interfering and serving links, a full control is possible. Here the coordinator 11 makes decisions about the assignment of the RRs for the network of the attached BSs 12, 13. The BSs 12, 13 then have to implement these decisions.

It is also possible that the coordinator 11 makes recommendations. It is then up to the individual BSs 12, 13 to follow them or not. This is especially useful, when the coordinator 11 does not have real-time information. In such cases, it could happen that a BS 12, 13 overwrites certain decisions by the coordinator 11 if it has newer information.

Thus, the previous described framework for coordinated scheduling and transmission point blanking of the state of the art consists of a central entity (coordinator 11) which can coordinate RRs (RR 1, RR 2) in the attached network of several BSs 12, 13.

US 2015/0063222 A1 provides a method and a system to support coordinated scheduling, i.e. methodology to generate and share information to describe the performance of each user under different interference hypotheses, and a net benefit metric to compare and finally select one interference hypothesis between multiple options. Furthermore, US 2015/0063222 A1 includes decentralized and centralized architectures for determining the coordinated scheduling decision. In both cases, it is assumed that all the possible scheduling decisions are available. In the case that a centralized architecture is considered, there are a maximum of $2^M$ possible interference hypotheses corresponding to M base stations belonging to the cooperation cluster. Generating all possible interference scenarios and evaluating the one with the maximum benefit as proposed is not efficient and might not be possible in polynomial time. Additionally, decisions made on one PRB might or might not influence the possible decisions on other PRBs. If they influence the decisions on other PRBs, it would imply to generate and compare the scheduling decisions on the basis of all PRBs, i.e. $2^{(M*L)}$ possibilities, with L the number of PRBs.

SUMMARY

In an exemplary embodiment, the present invention provides a method for coordinated scheduling with transmission point blanking of a plurality of radio resources. A network comprises at least two base stations, each of the at least two base stations being connectable to at least one mobile station. The method includes the steps of: a) calculating, by a coordinator, a first metric value for each combination of a mobile station of the network and each of the plurality of radio resources under the assumption that the at least two base stations are active; b) calculating, by the coordinator, a second metric value for each combination of a mobile station of the network and each of the plurality of radio resources under the assumption that at least one of the at least two base stations which is not connected to the respective mobile station using a concerned radio resource is muted; c) selecting, by the coordinator, the highest metric value from the calculated metric values; d) determining, by the coordinator, whether or not to assign the radio resource to the mobile station corresponding to the highest metric value; e) setting the other metric values corresponding to the radio resource to a predefined metric value; and f) repeating steps c) to e) for the next highest metric value until all metric values are set to the predefined metric value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
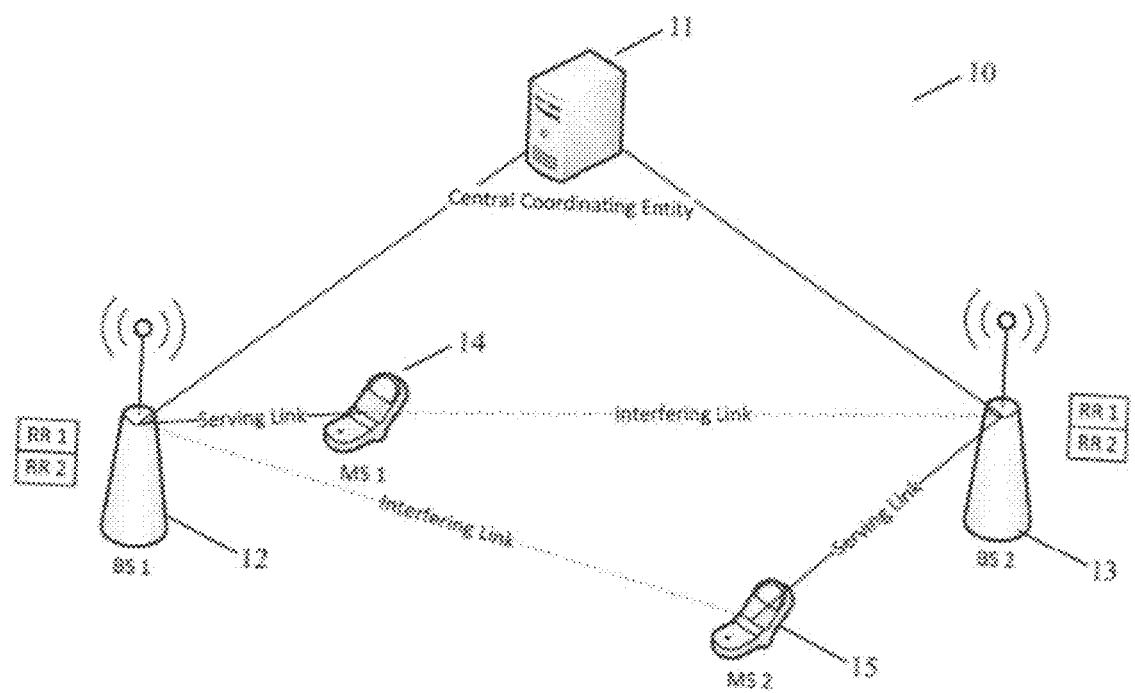
FIG. 1 illustrates an exemplary mobile radio network.

Exemplary embodiments of the present invention provide information to support the generation of possible scheduling decisions and compares them in order to select a decision that provides the highest metric with respect to the benefit introduced in the present specification.

Exemplary embodiments of the invention provide a method and a system for efficient coordinated radio resource assignment.

According to a first aspect of the present invention a method for coordinated scheduling with transmission point blanking of a plurality of radio resources is provided. A network comprises at least two base stations (BS1, BS2, . . . , BSN) each of said base stations can be connected to at least one mobile station (MS1-1, MS1-2, . . . MS1-N; MS2-1, MS2-2, . . . MS2-N; . . . ; MSN-1, MSN-2, . . . , MSN-N). The method comprises the steps of: a) calculating a first metric value for each combination of a mobile station of the network and each of the plurality of radio resources under the assumption that the at least two base stations are active; b) calculating a second metric value for each combination of a mobile station of the network and each of the plurality of radio resources under the assumption that at least one of the at least two base stations which is not connected to the respective mobile station using a concerned radio resource is muted, wherein preferably third, fourth and further metric values are calculated for every possible muting combination of the at least two base stations which are not connected to the respective mobile station; c) selecting the highest metric value from the calculated metric values; d) assigning or not assigning the radio resource to the mobile station corresponding to the highest metric value, wherein optionally an aggregated gain calculated from the metric values of a group of mobile stations is taken into account; e) setting the other metric values corresponding to the assigned or not assigned radio resource to a predefined metric value, preferably to zero; f) and repeating steps c) to e) for the next highest metric value preferably in descending order until all metric values are set to the predefined metric value.

Above step d) is preferably a decision of whether to assign the radio resource to the mobile station corresponding to the highest metric value or not to assign the radio resource to the mobile station corresponding to the highest metric value. In either case, the subsequent steps are executed after it is decided whether to assign or not to assign the radio resource to the mobile station corresponding to the highest metric value.

Preferably, calculating first and second metric values is based on calculating a throughput each mobile station can achieve on the respective radio resource and/or the throughput each mobile station achieved in the past on the respective radio resource.

The metric values may reflect the importance of transmission towards the respective mobile station.

In addition, selecting the highest metric value may include randomly selecting one highest metric value out of a plurality of highest metric values having the substantially same value within a range of values.

The method may further comprise a step of determining if the highest metric value is based on the assumption that the at least two base stations are active or that at least one of the at least two base stations is muted, before assigning or not assigning the radio resource to the mobile station corresponding to the highest metric value.

Preferably, if it is determined that the highest metric value is based on the assumption that at least one of the at least two base stations is muted the method further comprises a step of determining if the corresponding radio resources at the base station to be muted and the base station connected to the selected mobile station are still available.

Preferably, if it is determined that the corresponding radio resources at the base station to be muted and the base station connected to the selected mobile station are still available the method further includes a step of determining the group of mobile stations based on respective metric values that are above a first predefined threshold value, preferably zero, under the assumption that the base station to be muted is muted.

The method may further include the steps of: removing mobile stations from the group of mobile stations that are connected to the same base station as the selected mobile station and removing mobile stations from the group of mobile stations having a lower metric value than a mobile station from the group of mobile stations that is connected to the same base station.

The method may further comprise a step of calculating an aggregated gain.

Preferably, the aggregated gain is calculated as: the sum of metric values of the selected mobile station and the group of mobile stations, minus the sum of metric values of the selected mobile station and the group of mobile station under the assumption that the at least two base stations are active, minus the average metric value of all mobile stations connected to the base station to be muted; or as the sum of metric values of the selected mobile station and the group of mobile stations, minus the sum of metric values of the selected mobile station and the group of mobile station under the assumption that the at least two base stations are active, minus sum of the metric values of all mobile stations connected to the base station to be muted; or as the sum of metric values of the selected mobile station and the group of mobile stations, minus the sum of metric values of the selected mobile station and the group of mobile station under the assumption that the at least two base stations are active, minus the maximum metric value of all mobile stations connected to the base station to be muted.

Furthermore, the method may further comprise a step of determining if the calculated aggregated gain is above a second predefined threshold value and assigning the radio resources to the selected mobile station and the group of mobile stations if it is determined that the calculated aggregated gain is above the second predefined threshold value. If it is determined that the calculated aggregated gain is below the second predefined threshold value no radio resource is assigned to the selected mobile station and/or the group of mobile stations.

Preferably, if it is determined that the corresponding radio resources at the base station to be muted and the base station connected to the selected mobile station is not available or if the radio resources are assigned or not assigned to the selected mobile station and/or the group of mobile stations the corresponding metric values are set to the first predefined metric value.

According to a further aspect of the present invention a system for implementing the method for coordinated scheduling with transmission point blanking is provided, the system being configured to perform the method according to the above described aspects.

In exemplary embodiments of the invention, each MS is connected to a BS. In general this should be the BS that can serve the MS with the strongest signal according to the location of the MS. However, the present invention is not limited to a specific assignment of the MSs to the BSs. It can also be performed with a different scheme. The above described method provides for an efficient way to determine which RRs of the BSs should be assigned to the MSs (so-called scheduling). The signal level itself with which the BS is serving the MS does not change by the above described method. However, by not using certain RRs (muting) interference can be reduced. According to the above, the assignment of the RRs is preferably done so that the MS that is most important can be served best (reflected by metric values). In another step it is determined if muting would be favorable to the assignment to reduce interference. If this is the case the RR at the parasitic BSs is not used.

The method as described in the present application relates to formulating a methodology to make a scheduling decision without requiring the evaluation of all possible scheduling alternatives, thus reducing calculation complexity and making it practical specially for cooperation of a large number of base stations.

Some preferred embodiments are now described with reference to the drawings. For explanation purpose, various specific details are set forth, without departing from the scope of the present invention as claimed.

In general, a preferred embodiment according to the present invention covers a method and a system for coordinated scheduling with transmission point blanking. It is designed to be executed in the coordinator 11 in the framework (network 10) described above with respect to FIG. 1. According to a preferred embodiment of the present invention two main characteristics are:

It has a relatively low complexity. This enables a quick decision in the coordinator 11.

It explicitly estimates the benefits and the losses of a decision in the coordinator 11. It can therefore be prevented that a decision is made which harms the network's 10 performance.

In particular FIG. 1 illustrates a mobile radio network 10 with two base stations (BSs) 12, 13, two mobile stations (MSs) 14, 15 and one coordinator 11. The main characteristics of the devices according to FIG. 1 have already been described above in connection with the description of an exemplary mobile radio network. Another formal description of those features is therefore omitted here. Rather, the differences to the above described features of the components of the network 10 are described in the following.

The RRs (RR1, RR2) in the mobile network 10 are assigned to the MSs 14, 15 in a process called scheduling. In case of coordinated scheduling (which is considered here) the scheduling happens for multiple BSs 12, 13 at the same time in a coordinated manner. After the scheduling, the actual data transmission takes place for a certain time (the time transmission interval—TTI). After an elapsed TTI, all previous scheduling decisions/resource assignments are deleted and the scheduling is executed again. A preferred embodiment relates to an efficient method and a system for coordinated scheduling including that some resource blocks are not used in order to reduce interference when necessary (so called muting).

It is also possible that a BS does not serve any MS in a TTI. In this case it can be excluded from the process. If there is no data queued for a certain MS in a TTI, this MS is not considered within the process in this TTI as there is no transmission required towards this MS.

Figure 2:
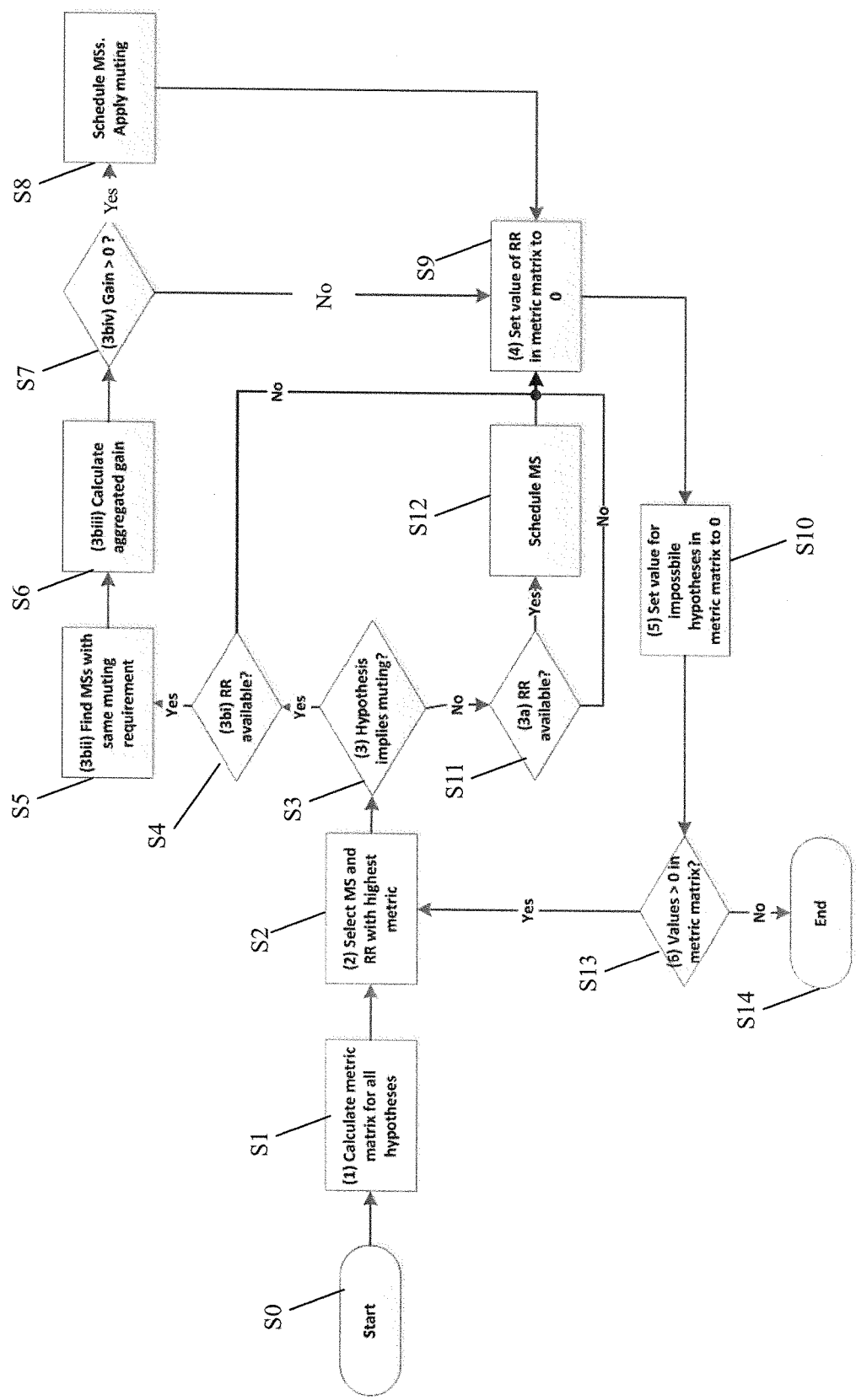
FIG. 2 illustrates a flow diagram according to a preferred embodiment according to the present invention.

FIG. 2 illustrates a flow diagram of a preferred embodiment. In general, it describes a joint scheduling process for a group of BSs 12, 13 that serve a group of MSs 14, 15. Each MS 14, 15 is connected to a single BS 12, 13, e.g. BS 12 is serving MS 14 as illustrated in FIG. 1. The process will be described in detail below. Preferably, the process assigns the RRs to the MSs 14, 15 such that data, which is queued at the BSs 12, 13 for transmission towards the MSs 14, 15, is transferred to them in an optimized way.

Figure 3:
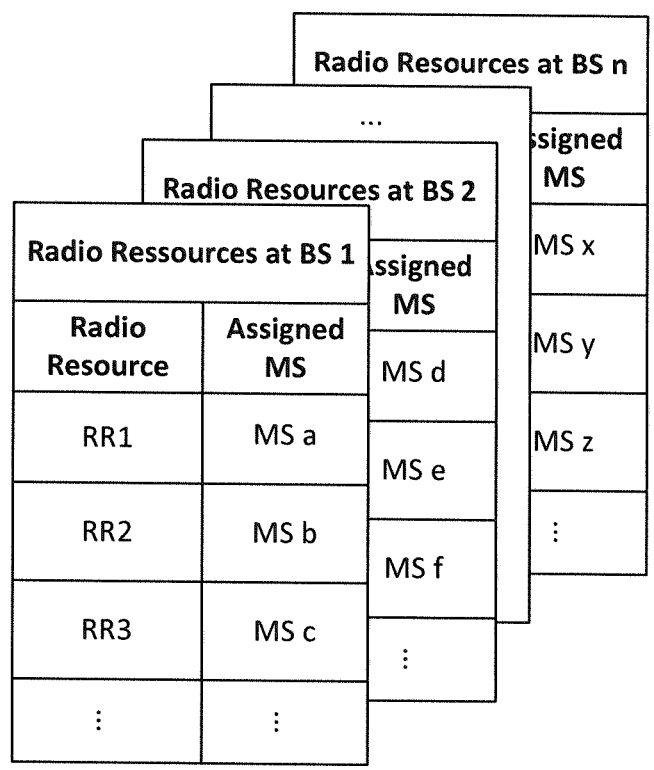
FIG. 3 illustrates exemplary resource assignment tables for multiple base stations according to one embodiment of the present invention.

In addition, FIG. 3 illustrates the resource assignment tables for multiple BSs (BS 12, BS 13, . . . , BS N). EachBS (BS 12, BS13, . . . , BS N) serves one or more MSs (MS 14, MS 15, . . . , MS N). Preferably, the joint scheduling process fills all tables depicted in FIG. 3. Therefore an RR assignment for each BS (BS 12, BS 13, . . . , BS N) has to be performed. In addition it is preferred that the process will not allocate certain RRs (RR1, RR2, . . . , RRN) for some BSs (BS 12, BS 13, . . . , BS N) in order to reduce interference for other BSs (BS 12, BS 13, . . . , BS N).

More particular, the embodiment of the present invention according to FIG. 2 may have a starting point at step zero S0. In a first step S1 the process may calculate the metric matrix for all hypotheses. A hypothesis is defined as an assumption about the usage of the RRs by the BSs. One hypothesis may for example be that only BS 12 uses RR1 while other BSs are muted. In a second step S2 the process selects a MS and a RR with the highest metric value. Furthermore, in a third step S3 the process may check if the selection of S2 is based on a hypothesis that implies muting of a BS.

If it is determined in step S3 that muting is implied the process continues at step S4, where the process may check if the selected RR is still available at the BS(s) to be muted and the BS serving the MS with the highest metric value.

If it is determined that the selected RR is still available, the process continues at step S5, where the process identifies MSs with the same muting requirement. Subsequently, at step S6 the aggregated gain of the muting is calculated. At step S7 it is determined if the calculated aggregated gain at step S6 is above a certain threshold (preferably above zero).

If the aggregated gain is determined to be above the threshold the process continues at step S8 and schedules MSs together with applying the muting before continuing at step S9. At step S9 the value of the selected RR is set to a certain value (preferably to zero). At a further step S10 other metric values for certain hypotheses that may be impossible after assigning the selected RR are also set to a certain value (preferably to zero). Next, at step S13 the process determines if the metric matrix contains any values which are different from a certain value y (preferably y being zero).

If it is determined at step S13 that there are values different from a certain value y (preferably y being zero), the process continues at step S2.

If however, it is determined at step S13 that there are no more values in the metric matrix that are different from a certain value y (preferably y being zero) the process ends at step S14. It is of course possible to restart the process after the last step S14, i.e. after step S14 the process starts in another TTI at step S0 again.

If it is determined at step S3 that muting is not implied the process continues at step S11, where the process determines if the selected RR is still available at the BS serving the MS with the highest metric value.

If the process determines at step S11 that the RR is still available, the process schedules the MS at step S12 and further continues with step S9.

If it is determined at step S7 that the calculated aggregated gain is not above the threshold value (preferably above zero), the process continues at step S9.

If it is determined that at step S4 or S11 that the selected RR is not available the process continues with step S9.

The process of a preferred embodiment of the present invention according to FIG. 2 can also be described as follows:

1. (S1) For each MS a metric is calculated which expresses how important the transmission towards the MS is. This may be favorable, as it is often not possible to transmit the complete data which is queued at the BSs in one TTI. As a result the individual transmissions to the MSs are in competition for the RRs. Thus, it may be decided which transmissions are the most important at the moment. The metric usually consists of two main factors:
    a. The current throughput the MS can achieve: From a network perspective it is often reasonable to prefer MSs that can achieve a high throughput.
    b. The throughput the MS achieved in the past: If an MS achieved a low throughput in the past, it may be preferred to avoid customer dissatisfaction.
One metric value is calculated per MS and RR. The same process is then repeated under different hypothesis: what would be the metric for the MS (per RR) if one or multiple of the neighboring BSs would not transmit on the concerned RR and therefore reduce the interference?
The information which may be used to calculate the metric values can, for the example of LTE-Advanced, be obtained from MSs' feedback as it has been standardized in LTE Release 11.
After step 1 (S1) was executed, the following information is available: A metric value per MS, RR and hypothesis. The values are stored inside a 3-dimensional matrix with the size: number of resource blocks, number of MSs, number of hypothesis (see also FIG. 3 for an example).

2. (S2) Within the matrix calculated in step 1 (S1), the highest single metric value is selected. This value corresponds to the highest metric value that currently exists within the BSs attached to the coordinating entity. Therefore, it is of highest interest for the system to allocate the corresponding RR to the MS. In case there are multiple elements in the matrix with the same metric value, out of these a random choice may be made. The result of this step is that it was decided that RR x (e.g. RR1) should be allocated to a selected MS under a certain hypothesis.

3. (S3) The hypothesis from step 2 (S2) is checked. There are two possibilities:

a. The hypothesis is that no other BS is muted to improve the interference situation of the selected MS. In this case it is checked if the corresponding RR is available at the BS where the MS is attached to (S11). If this is the case, the RR can be assigned (S12).
b. The hypothesis implies that other BSs have to be muted on the corresponding RR. In this case additional steps are required to check if the muting is beneficial from a system perspective:
   i. It has to be checked if the corresponding RRs at the potentially muted BSs, as well as the BS serving the selected MS, are still available (S4). If this is not the case, the process continues with item 4 as below (step S9).
   ii. (S5) In order to calculate the positive and negative effects of the muting, other MSs which can benefit from the muting decisions have to be identified. The identification of MSs is done based on the metric matrix, where a group of MSs with the same muting requirement/hypothesis is identified. From this group the following MSs are removed:
      1. MSs which are attached to the same BS as the selected MS, because the RR at this BS is already reserved for the selected MS such that no other MS at the same BS can use it.
      2. MSs, where a second MS attached to the same BS have a higher priority, because it is more important to serve other MSs at this point.

The remaining MSs together with the selected MS selected form a group of MSs that may benefit from the potential muting.

iii. (S6) The aggregated gain of the muting is calculated. There are different options to calculate this value. Examples are described below.
   iv. (S7) If the gain value calculated in 3.b.iii (potentially minus a threshold value) exceeds zero, the muting is expected to be beneficial. The RRs are assigned to the group of MSs calculated in step 3.b.ii (S8).
4. (S9) Independent of whether the RR(s) could be assigned or not, the value for the RR, the MS(s) (in case of muting for the complete group calculated in step 3.b.ii) and the hypothesis in the metric matrix is set to zero. This reflects that either the assignment was made or is not possible/beneficial at the moment. In case the assignment was not made, it is still possible to serve the MS in later stages of the scheduling process.
5. (S10) As the scheduling process continues, elements from the metric matrix which are not possible any more should preferably be removed. For example:
   a. If an RR has been allocated to an MS at a BS, other MSs are not able to use this RR any more. The metric value for all MSs attached to the corresponding BS is set to zero for this RR.
   b. All elements of the metric matrix for hypotheses which are not possible any more are also set to zero. This is the case when a BS uses an RR so that it cannot be muted on that RR any more.
6. (S13) The process continues with step 2 (S2) until there is no element in the metric matrix with a value unequal to zero any more.

Next, the calculation of the aggregated gain is further described. There are different alternatives to calculate the average gain of a muting decision, one of which may be selected, examples are:
1. The gain is defined as the sum of the metric values of the MS benefitting from the muting (as calculated in step 3.b.ii) minus the sum of the metric values these MSs would achieve without muting minus the averaged metric (averaged over all MSs on the current RR) in the BSs that would be muted.
2. The gain is defined as the sum of the metric values of the MS benefitting from the muting (as calculated in step 3.b.ii) minus the sum of the metric values these MSs would achieve without muting minus the sum metric (summed over all MSs on the current RR) in the BSs that would be muted.
3. The gain is defined as the sum of the metric values of the MS benefitting from the muting (as calculated in step 3.b.ii) minus the sum of the metric values these MSs would achieve without muting minus the maximum metric (maximum calculated over all MSs on the current RR) in the BSs that would be muted.

In addition, it is possible to estimate the implications of the muting onto future scheduling decisions. The estimate value (being it positive or negative) can be added to the aggregated gain calculated with any of the alternatives listed above, for example.

In order to further illustrate a preferred embodiment according to the present invention the following example is given for the previously described process.

It is assumed that:
BS 1 serves 2 MSs: MS 1-1 and MS 1-2
BS 2 serves 2 MSs: MS 2-1 and MS 2-2
BS 3 serves 1 MS: MS 3-1
Each BS can make use of 3 RRs: RR 1, RR 2 and RR 3.

It is assumed that alternative 1 (see item 1 of the above example for calculating the aggregated gain) is used to calculate the aggregated gain for a muting. The following metric matrix was calculated (for this example random values were created):

| Metric values under the hypothesis that no BS is muted | | | | | |
|---|---|---|---|---|---|
| | MS 1-1 | MS 1-2 | MS 2-1 | MS 2-2 | MS 3-1 |
| RR 1 | 5 | 3 | 1 | 2 | 2 |
| RR 2 | 5 | 5 | 1 | 1 | 3 |
| RR 3 | 3 | 2 | 3 | 4 | 3 |

Average metric of BS 1:
   On RR 1: (5+3)/2=4
   On RR 2: (5+5)/2=5
   On RR 3: (3+2)/2=2.5
Average metric of BS 2:
   On RR 1: (1+2)/2=1.5
   On RR 2: (1+1)/2=1
   On RR 3: (3+4)/2=3.5
Average metric of BS 3:
   On RR 1: 2
   On RR 2: 3
   On RR 3: 3

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 5 | 6 | 3 |
| RR 2 | 0 | 0 | 3 | 6 | 3 |
| RR 3 | 0 | 0 | 3 | 5 | 4 |

| Metric values under the hypothesis that BS 2 is muted | | | | | |
|---|---|---|---|---|---|
| | MS 1-1 | MS 1-2 | MS 2-1 | MS 2-2 | MS 3-1 |
| RR 1 | 5 | 9 | 0 | 0 | 3 |
| RR 2 | 8 | 8 | 0 | 0 | 3 |
| RR 3 | 3 | 3 | 0 | 0 | 4 |

| Metric values under the hypothesis that BS 3 is muted | | | | | |
|---|---|---|---|---|---|
| | MS 1-1 | MS 1-2 | MS 2-1 | MS 2-2 | MS 3-1 |
| RR 1 | 5 | 5 | 2 | 4 | 0 |
| RR 2 | 5 | 5 | 2 | 3 | 0 |
| RR 3 | 3 | 4 | 3 | 4 | 0 |

The four tables may be a 3-dimensional matrix. For visualization purposes they are depicted individually here.

The resource assignment process (as described above) operates as follows:

1. The highest value inside the metric matrix is selected. This is the value 9 for MS 1-2 on RR 1 under the hypothesis that BS 2 is muted.
2. It is checked if RR 1 is still available at BS 1. As muting is required at BS 2, also RR 1 has to be available there. Because this is the first run of the resource assignment, both requirements are fulfilled.
3. It is calculated whether the requested muting is beneficial or not. The benefit regarding MS 1-2 is calculated as 9 (metric in case BS 2 muted)−3 (metric in case no BS is muted)=6. In addition, all other MSs could also benefit from the muting of BS 2 on RR 1. However, MS 1-1 cannot, as it is attached to BS 1 which is supposed to serve MS 1-2 on this RR. MS 2-1 and MS 2-2 also cannot benefit, as they are served by BS 2 which is supposed to be muted. MS 3-1 remains. It shows a benefit of 3−2=1. The total benefit is 6+1=7. The cost of the muting is defined as the average metric of BS 2 on RR 1 which is (as previously calculated) 1.5. As the calculation of gain=benefit−cost ends up at a positive value, the muting is considered to be beneficial and the corresponding resource assignment is made:

| Current resource assignment | | | |
|---|---|---|---|
| | BS 1 | BS 2 | BS 3 |
| RR 1 | MS 1-2 | muted | MS 3-1 |
| RR 2 | | Not yet decided | |
| RR 3 | | | |

4. The metric matrix is updated. The new matrix reflects the situation that RR 1 cannot be assigned any more.

| Metric values under the hypothesis that no BS is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 5 | 5 | 1 | 1 | 3 |
| RR 3 | 3 | 2 | 3 | 4 | 3 |

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 3 | 6 | 3 |
| RR 3 | 0 | 0 | 3 | 5 | 4 |

| Metric values under the hypothesis that BS 2 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 8 | 8 | 0 | 0 | 3 |
| RR 3 | 3 | 3 | 0 | 0 | 4 |

| Metric values under the hypothesis that BS 3 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 5 | 5 | 2 | 3 | 0 |
| RR 3 | 3 | 4 | 3 | 4 | 0 |

5. Again the highest value in the metric matrix is selected. This is for MS 1-1 and MS 1-2, both on RR 2 and both under the hypothesis that BS 2 is muted. A random selection out of the two is made. Here it is assumed that MS 1-1 is selected. Besides MS 1-1, no other MS can benefit from the muting. The muting benefit is 8−5=3, while the cost for muting BS 2 on RR 2 is 1. As a result again the muting is applied:

| Current resource assignment | | | |
|---|---|---|---|
| | BS 1 | BS 2 | BS 3 |
| RR 1 | MS 1-2 | muted | MS 3-1 |
| RR 2 | MS 1-1 | muted | Not yet decided |
| RR 3 | | Not yet decided | |

6. The update of the metric matrix gives the following result:

| Metric values under the hypothesis that no BS is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 2 | 3 | 4 | 3 |

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 0 | 0 | 3 | 5 | 4 |

| Metric values under the hypothesis that BS 2 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 3 | 0 | 0 | 4 |

| Metric values under the hypothesis that BS 3 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 4 | 3 | 4 | 0 |

7. The highest value now occurs for MS 2-2 on RR 3 under the hypothesis that BS 1 is muted. The benefit for this muting is 5−4=1 (for MS 2-2) plus 4−3=1 (for MS 3-1). The total benefit cannot compensate the cost of 2.5. Therefore the corresponding decision is not made and the metric value of the corresponding element is set to zero:

| Metric values under the hypothesis that no BS is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 2 | 3 | 4 | 3 |

| Metric values under the hypothesis that BS 1 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 3 | 0 | 4 |

| Metric values under the hypothesis that BS 2 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 3 | 0 | 0 | 4 |

| Metric values under the hypothesis that BS 3 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 4 | 3 | 4 | 0 |

8. The highest value which occurs now is 4. It is assumed here that randomly RR 3 for MS 2-2 without muting is selected. The corresponding resource assignment is made:

| Current resource assignment | | | |
|---|---|---|---|
|  | BS 1 | BS 2 | BS 3 |
| RR 1 | MS 1-2 | muted | MS 3-1 |
| RR 2 | MS 1-1 | muted | Not yet decided |
| RR 3 | Not yet decided | MS 2-2 | Not yet decided |

9. The update metric matrix reflects the fact, the BS 2 cannot use RR 3 anymore and a muting of BS 2 on RR 3 as well is not possible any more:

| Metric values under the hypothesis that no BS is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 2 | 0 | 0 | 3 |

| Metric values under the hypothesis that BS 1 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 0 | 0 | 4 |

| Metric values under the hypothesis that BS 2 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 0 | 0 | 0 | 0 | 0 |

| Metric values under the hypothesis that BS 3 is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 4 | 0 | 0 | 0 |

10. The high metric value is again 4. It's assumed that MS 1-2 is selected from RR 3 by random choice under the hypothesis that BS 3 is muted. The benefit of this muting is 4−2=2, the cost is 3. Therefore the corresponding resource is not assigned and the metric value is set to zero:

| Metric values under the hypothesis that no BS is muted | | | | | |
|---|---|---|---|---|---|
|  | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 2 | 0 | 0 | 3 |

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 0 | 0 | 4 |

| Metric values under the hypothesis that BS 2 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 0 | 0 | 0 | 0 | 0 |

| Metric values under the hypothesis that BS 3 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 0 | 0 | 0 | 0 |

11. The highest metric value is now 4 (RR 3 for MS 3-1 under the assumption that BS 1 is muted). The benefit of this muting is 4−3=1 while the cost is 2.5. Accordingly the decision is not made and the value is set to zero:

| Metric values under the hypothesis that no BS is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 3 | 2 | 0 | 0 | 3 |

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 0 | 0 | 0 |

| Metric values under the hypothesis that BS 2 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 3 |
| RR 3 | 0 | 0 | 0 | 0 | 0 |

| Metric values under the hypothesis that BS 3 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 0 | 0 | 0 | 0 |

12. The highest metric value is now 3 for several elements. By random choice MS 3-1 is selected for RR 2 without muting. The assignment is made and the metric matrix is updated:

| Current resource assignment | | | |
|---|---|---|---|
| | BS 1 | BS 2 | BS 3 |
| RR 1 | MS 1-2 | muted | MS 3-1 |
| RR 2 | MS 1-1 | muted | MS 3-1 |
| RR 3 | Not yet decided | MS 2-2 | Not yet decided |

| Metric values under the hypothesis that no BS is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 2 | 0 | 0 | 3 |

| Metric values under the hypothesis that BS 1 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 0 | 0 | 0 |

| Metric values under the hypothesis that BS 2 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 0 | 0 | 0 | 0 | 0 |

| Metric values under the hypothesis that BS 3 is muted | | | | | |
|---|---|---|---|---|---|
| | MS 1-1 | MS 1-2 | MS 2-1 | MS 2-2 | MS 3-1 |
| RR 1 | 0 | 0 | 0 | 0 | 0 |
| RR 2 | 0 | 0 | 0 | 0 | 0 |
| RR 3 | 3 | 0 | 0 | 0 | 0 |

13. RR 3 is now assigned to MS 3-1 without muting:

| Current resource assignment | | | |
|---|---|---|---|
| | BS 1 | BS 2 | BS 3 |
| RR 1 | MS 1-2 | muted | MS 3-1 |
| RR 2 | MS 1-1 | muted | MS 3-1 |
| RR 3 | Not yet decided | MS 2-2 | MS 3-1 |

Metric values under the hypothesis that no BS is muted

|      | MS 1-1 | MS 1-2 | MS 2-1 | MS 2-2 | MS 3-1 |
|------|--------|--------|--------|--------|--------|
| RR 1 | 0      | 0      | 0      | 0      | 0      |
| RR 2 | 0      | 0      | 0      | 0      | 0      |
| RR 3 | 3      | 2      | 0      | 0      | 0      |

Metric values under the hypothesis that BS 1 is muted

|      | MS 1-1 | MS 1-2 | MS 2-1 | MS 2-2 | MS 3-1 |
|------|--------|--------|--------|--------|--------|
| RR 1 | 0      | 0      | 0      | 0      | 0      |
| RR 2 | 0      | 0      | 0      | 0      | 0      |
| RR 3 | 0      | 0      | 0      | 0      | 0      |

Metric values under the hypothesis that BS 2 is muted

|      | MS 1-1 | MS 1-2 | MS 2-1 | MS 2-2 | MS 3-1 |
|------|--------|--------|--------|--------|--------|
| RR 1 | 0      | 0      | 0      | 0      | 0      |
| RR 2 | 0      | 0      | 0      | 0      | 0      |
| RR 3 | 0      | 0      | 0      | 0      | 0      |

Metric values under the hypothesis that BS 3 is muted

|      | MS 1-1 | MS 1-2 | MS 2-1 | MS 2-2 | MS 3-1 |
|------|--------|--------|--------|--------|--------|
| RR 1 | 0      | 0      | 0      | 0      | 0      |
| RR 2 | 0      | 0      | 0      | 0      | 0      |
| RR 3 | 0      | 0      | 0      | 0      | 0      |

14. After the final assignment of RR 3 to MS 1-2 (again by random choice), the metric matrix does not contain any element unequal to zero any more. The assignment therefore comes to an end.

Current resource assignment

|      | BS 1   | BS 2   | BS 3   |
|------|--------|--------|--------|
| RR 1 | MS 1-2 | muted  | MS 3-1 |
| RR 2 | MS 1-1 | muted  | MS 3-1 |
| RR 3 | MS 1-2 | MS 2-2 | MS 3-1 |

According to a further example it is assumed that the number of base stations is M=3. In that case there are the following possible interference scenarios for one Physical Resource Block PRB:
1. BS1 off, BS2 off, BS3 off,
2. BS1 off, BS2 off, BS3 on,
3. BS1 off, BS2 on, BS3 off,
4. BS1 off, BS2 on, BS3 on,
5. BS1 on, BS2 off, BS3 off,
6. BS1 on, BS2 off, BS3 on,
7. BS1 on, BS2 on, BS3 off,
8. BS1 on, BS2 on, BS3 on.

For this example the method according to a preferred embodiment of the present invention comprises the following steps:
1. Compare the proportional fair metric of all users (UEs), over all PRBs, for the reported interference hypotheses (if a user reports information for the two strongest interferers, there are 4 interference hypotheses per UE).
2. Select the user with the highest metric.
3. If the interference hypotheses assumes no muting, then
   a. Schedule the user in the specific PRB
   b. Remove from the set of possible interference hypotheses any user connected to the same serving BS in the specific PRB, i.e. no other user can be scheduled at the same time (for Single User Multiple Input Multiple Output (SU-MIMO))
   c. Remove from the set of possible interference hypotheses any user connected to another BS, that requires muting of the BS that has been defined as transmitting, i.e. no further evaluation of potential muting to the BS that has already scheduled a user for a specific PRB
4. If the interference hypotheses assumes muting, then
   a. Identify other users, connected to different BSs that require the same interference hypotheses and have the maximum proportional fair metric among the users connected to the same serving BS
   b. Evaluate a net benefit by using for instance, the above described benefit metric for all selected users and the required muted BS(s)
   c. If the net benefit is greater than a threshold, e.g. 0, then
      i. Schedule the user(s) in the specific PRB
      ii. Set the required BS(s) as muted
      iii. Remove from the set of possible interference hypotheses any user connected to the same serving BS(s) in the specific PRB, i.e. no other user can be scheduled at the same time (for SU-MIMO)
      iv. Remove from the set of possible interference hypotheses any user connected to another BS, that requires muting of the BS(s) that has(have) been defined as transmitting, i.e. no further evaluation of potential muting to the BS(s) that has(have) already scheduled a user for a specific PRB
      v. Remove from the set of possible interference hypotheses any user connected to the muted BS(s) in the specific PRB, i.e. no change of the muting decision is possible
   d. If the net benefit is lower than a threshold, then
      i. Remove from the set of possible interference hypotheses the selected users in the specific PRB, i.e. no decision is made and the already analyzed interference hypotheses are not further considered
5. Repeat steps 2-4 until all PRBs from all BSs have been defined as scheduled or muted As an alternative for steps 3 and 4, an additional step would include to remove invalid transmission schemes for the scheduled user(s), e.g. if the user is scheduled for an interference hypotheses assuming a beamforming transmission, no additional scheduling of this user is allowed with different transmission schemes such as spatial multiplexing or Single Input Multiple Output (SIMO).

Let us assume there are 6 users connected to the 3 BSs, 2 UEs per BS as follows:
BS1: UE1 and UE2
BS2: UE3 and UE4
BS3: UE5 and UE6

The interference hypotheses reports for one PRB are given as follows, where SE corresponds to the Spectral Efficiency:

| UE1 | | |
|---|---|---|
| Interference hypothesis | SE [bps/Hz] | Muted BS |
| 1 | 2 | N.A. |
| 2 | 2 | 2 |
| 3 | 3 | 3 |
| 4 | 3.5 | 2, 3 |

| UE2 | | |
|---|---|---|
| Interference hypothesis | SE [bps/Hz] | Muted BS |
| 1 | 1 | N.A. |
| 2 | 3 | 2 |
| 3 | 3 | 3 |
| 4 | 4.5 | 2, 3 |

| UE3 | | |
|---|---|---|
| Interference hypothesis | SE [bps/Hz] | Muted BS |
| 1 | 3 | N.A. |
| 2 | 4 | 1 |
| 3 | 4 | 3 |
| 4 | 5 | 1, 3 |

| UE4 | | |
|---|---|---|
| Interference hypothesis | SE [bps/Hz] | Muted BS |
| 1 | 0.5 | N.A. |
| 2 | 2 | 1 |
| 3 | 3.5 | 3 |
| 4 | 5.4 | 1, 3 |

| UE5 | | |
|---|---|---|
| Interference hypothesis | SE [bps/Hz] | Muted BS |
| 1 | 1 | N.A. |
| 2 | 3 | 1 |
| 3 | 4 | 2 |
| 4 | 4.5 | 1, 2 |

| UE6 | | |
|---|---|---|
| Interference hypothesis | SE [bps/Hz] | Muted BS |
| 1 | 0.1 | N.A. |
| 2 | 1.5 | 1 |
| 3 | 2 | 2 |
| 4 | 5 | 1, 2 |

One reference scenario could be for instance, the case when no muting is applied. If we assume that the proportional fair metric is equal to the reported spectral efficiency, then the scheduling decision would be:

| BS | UE | PF metric |
|---|---|---|
| 1 | 1 | 2 |
| 2 | 3 | 3 |
| 3 | 5 | 1 |

If a different scheduling decision is to be made, implying the application of a different interference hypotheses, then a net benefit is to be calculated in order to decide if the muting is recommendable. One of the proposed operations would be as follows in the case that BS2 is to be muted:

1. For BS 1: select UE2 with PF metric of 3
2. For BS2: mute with PF metric loss of 3
3. For BS3: select UE5 with PF metric of 4
4. The net benefit is calculated as: $(3-2)+(-3)+(4-1)=1-3+3=1$ In this equation, the first term "(3−2)" comprises the following values. The value "3" represents the sum of benefit for base station 1. The value "2" represents the sum of benefit for base station 1 without muting. The second term "(−3)" represents the value of the sum of benefit for base station 2 wherein the "−"-sign is used because the base station 2 is muted and therefore the sum has to be subtracted from the whole sum. The third term "(4−1)" represents the result of the calculation of the sum of the benefit for base station 3 minus the sum without muting base station 2. As can be seen from this calculation the total sum equals to "1". Since the net benefit is greater than 0, there is a benefit if the BS2 is muted in the system. Therefore, changing the reference scenario to mute BS2 is recommendable.

According to US 2015/0063222 A1 all possible scenarios are to be evaluated in order to identify the best net benefit. In the present example there are then $2^3=8$ interference hypotheses as explained before. Then, the following procedure is executed:

1. Evaluate the net benefits for each scenario:
   a. BS 1 off, BS2 off, BS3 off: −2−3−1=−6
   b. BS1 off, BS2 off, BS3 on: UE6→−2−3+4=−1
   c. BS1 off, BS2 on, BS3 off: UE4→−2+2.4−1=−0.6
   d. BS1 off, BS2 on, BS3 on: UE3, UE5→−2+1+2=1
   e. BS1 on, BS2 off, BS3 off: UE2→2.5−3−1=−1.5
   f. BS1 on, BS2 off, BS3 on: UE2, UE5→1−3+3=1
   g. BS1 on, BS2 on, BS3 off: UE1, UE3→1+1−1=1
   h. BS1 on, BS2 on, BS3 on: UE1, UE3, UE5→0+0+0=0
2. Select the scenario with the highest net benefit: any of the scenarios d, f or g By following the proposed algorithm according to the present invention, there is no need to evaluate all interference hypotheses. The procedure is as follows:
   a. Select the highest metric above all users: UE4 (hypothesis 4)→mute BS1 and BS3
   b. Identify users in other serving BS(s) that have as highest metric the same interference hypothesis→none
   c. Evaluate the net benefit, e.g. by using the above metric for example: 2.4−2−1=−0.6
   d. If the net benefit is lower or equal than a threshold, e.g. 0, then there is a loss or not benefit
      i. Remove the hypothesis from the list: UE4 (hypothesis 4) is removed, i.e. set the proportional fair metric to a default value, e.g. 0
      ii. If not all proportional fair metrics set to a default value, e.g. 0, then return to a, otherwise stop
   a. UE3 (hypothesis 4)→mute BS1 and BS3. From previous analysis the net benefit is negative, then set the proportional fair metric to 0 a. UE 6 (hypothesis 4)→mute BS 1 and BS2.
b. None
c. 4−3−2=−1
d. i.
a. UE2 (hypothesis 4)→mute BS2 and BS3
b. None
c. 2.5−3−1=−1.5
d. i.
a. UE5 (hypothesis 4)→mute BS1 and BS2
b. None
c. 3.5−3−2=−1.5
d. i.
a. UE3 (hypothesis 2)→mute BS 1
b. UE5 (hypothesis 2)→mute BS1
c. 1+2−2=1
e. If the net benefit is higher than a threshold, e.g. 0, then there is benefit of muting
   i. Establish the muting: BS1 is muted
   ii. Schedule the users according to the hypothesis: UE3 in BS2 with hypothesis 2, UE5 in BS3 with hypothesis 2
   iii. Remove users in muted BS(s), i.e. set remaining metrics to a default value, e.g. 0: UE1 in hypotheses 1, 2, 3 and 4. UE2 in hypotheses 1, 2 and 3
   iv. Remove users in the scheduled BS(s), i.e. set remaining metrics to a default value, e.g. 0: UE4 in hypotheses 1, 2 and 3. UE6 in hypotheses 1, 2 and 3.
   v. If not all proportional fair metrics set to a default value, e.g. 0, then return to a, otherwise stop
Stop In this example, 6 iterations were performed to define a scheduling decision that also corresponds to the optimal possibility. If the number of BSs increases, the computation complexity gain of the proposed scheme according to the present invention becomes even more apparent.

Thus, according to the present invention, there is no requirement to generate the total $2^M$ or $2^{(M*L)}$ (with M being the number of base stations and L the number of physical resource blocks) possible interference hypotheses and to evaluate and compare the net benefits. On the contrary, net benefits of a subset of the BSs are going to be considered for making a coordinated scheduling decision on the subset, which further restricts the possible decisions for the remaining BSs and PRBs. In this way, the computation complexity is restricted at the cost of a possible reduction of the net benefit. Thus, the present invention relates to a methodology to generate the scheduling decision that avoids evaluating all the $2^M$ or $2^{(M*L)}$ possible interference hypotheses. Hence, the computation complexity is significantly reduced.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for coordinated scheduling with transmission point blanking of a plurality of radio resources, wherein a network comprises at least two base stations, each of the at least two base stations being connectable to at least one mobile station, the method comprising the steps of:
   a) calculating, by a coordinator, a first metric value for each combination of a mobile station of the network and each of the plurality of radio resources under the assumption that the at least two base stations are active;
   b) calculating, by the coordinator, a second metric value for each combination of a mobile station of the network and each of the plurality of radio resources under the assumption that at least one of the at least two base stations which is not connected to the respective mobile station using a concerned radio resource is muted;
   c) selecting, by the coordinator, the highest metric value from the calculated metric values;
   d) determining, by the coordinator, whether or not to assign the radio resource to the mobile station corresponding to the highest metric value;
   e) setting, by the coordinator, the other metric values corresponding to the radio resource to a predefined metric value;
   f) repeating steps c) to e) for the next highest metric value until all metric values are set to the predefined metric value; and
   g) coordinating, by the coordinator, transmissions of the at least two base stations to respective mobile stations using the determined assignments of radio resources.

2. The method according to claim 1, wherein calculating the first and second metric values is based on calculating a throughput each mobile station can achieve on the respective radio resource and/or the throughput each mobile station achieved in the past on the respective radio resource.

3. The method according to claim 1, wherein the metric values reflect the importance of transmission towards the respective mobile station.

4. The method according to claim 1, wherein selecting the highest metric value includes randomly selecting one highest metric value out of a plurality of highest metric values having the same value.

5. The method according to claim 1, wherein before determining whether or not to assign the radio resource to the mobile station corresponding to the highest metric value, the method further comprises a step of:
determining if the highest metric value is based on the assumption that the at least two base stations are active or that at least one of the at least two base stations is muted.

6. The method according to claim 5, wherein if it is determined that the highest metric value is based on the assumption that at least one of the at least two base stations is muted, the method further comprises a step of:
determining if the corresponding radio resources at the base station to be muted and the base station connected to the selected mobile station are still available.

7. The method according to claim 6, wherein if it is determined that the corresponding radio resources at the base station to be muted and the base station connected to the selected mobile station are not available, the corresponding metric values are set to the first predefined metric value.

8. The method according to claim 5, wherein the method further comprises a step of:
determining the group of mobile stations based on respective metric values that are above a first predefined threshold value under the assumption that the base station to be muted is muted.

9. The method according to claim 8, further comprising the steps of:
removing mobile stations from the group of mobile stations that are connected to the same base station as the selected mobile station; and
removing mobile stations from the group of mobile stations having a lower metric value than a mobile station from the group of mobile stations that is connected to the same base station.

10. The method according to claim 9, wherein an aggregated gain is calculated as the sum of metric values of the selected mobile station and the group of mobile stations, minus the sum of metric values of the selected mobile station and the group of mobile station under the assumption that the at least two base stations are active, minus the average metric value of all mobile stations connected to the base station to be muted.

11. The method according to claim 9, wherein an aggregated gain is calculated as the sum of metric values of the selected mobile station and the group of mobile stations, minus the sum of metric values of the selected mobile station and the group of mobile station under the assumption that the at least two base stations are active, minus the sum of metric values of all mobile stations connected to the base station to be muted.

12. The method according to claim 9, wherein an aggregated gain is calculated as the sum of metric values of the selected mobile station and the group of mobile stations, minus the sum of metric values of the selected mobile station and the group of mobile station under the assumption that the at least two base stations are active, minus the maximum metric value of all mobile stations connected to the base station to be muted.

13. The method according to claim 8, wherein the first predefined threshold value is zero.

14. The method according to claim 1, wherein third, fourth and further metric values are calculated for every possible muting combination of the at least two base stations which are not connected to the respective mobile station.

15. The method according to claim 1, wherein an aggregated gain calculated from the metric values of a group of mobile stations is taken into account when determining whether or not to assign the radio resource to the mobile station corresponding to the highest metric value.

16. The method according to claim 15, wherein the method further comprises a step of:
determining if the calculated aggregated gain is above a second predefined threshold value and assigning the radio resources to the selected mobile station and the group of mobile stations if it is determined that the calculated aggregated gain is above the second predefined threshold value.

17. The method according to claim 1, wherein the predefined metric value is zero.

18. A system for coordinated scheduling with transmission point blanking, the system comprising:
at least two base stations, each of the at least two base stations being connectable to at least one mobile station; and
a coordinator, configured to:
a) calculate a first metric value for each combination of a mobile station of the network and each of the plurality of radio resources under the assumption that the at least two base stations are active;
b) calculate a second metric value for each combination of a mobile station of the network and each of the plurality of radio resources under the assumption that at least one of the at least two base stations which is not connected to the respective mobile station using a concerned radio resource is muted;
c) select the highest metric value from the calculated metric values;
d) determine whether or not to assign the radio resource to the mobile station corresponding to the highest metric value;
e) set the other metric values corresponding to the radio resource to a predefined metric value;
f) repeat c) to e) for the next highest metric value until all metric values are set to the predefined metric value; and
g) coordinate transmissions of the at least two base stations to respective mobile stations using the determined assignments of radio resources.

* * * * *